US009621532B2

(12) United States Patent
Chiba et al.

(10) Patent No.: US 9,621,532 B2
(45) Date of Patent: Apr. 11, 2017

(54) INFORMATION PROCESSING DEVICE AND METHOD FOR CONTROLLING INFORMATION PROCESSING DEVICE

(71) Applicant: SHARP KABUSHIKI KAISHA, Osaka-shi, Osaka (JP)

(72) Inventors: Masahiro Chiba, Osaka (JP); Satoshi Kitagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 77 days.

(21) Appl. No.: 14/649,247

(22) PCT Filed: Oct. 4, 2013

(86) PCT No.: PCT/JP2013/077163
§ 371 (c)(1),
(2) Date: Jun. 3, 2015

(87) PCT Pub. No.: WO2014/087731
PCT Pub. Date: Jun. 12, 2014

(65) Prior Publication Data
US 2015/0304295 A1   Oct. 22, 2015

(30) Foreign Application Priority Data
Dec. 5, 2012   (JP) .................................. 2012-266763

(51) Int. Cl.
*H04W 12/08*   (2009.01)
*H04L 29/06*   (2006.01)
*G06F 21/33*   (2013.01)

(52) U.S. Cl.
CPC ............ *H04L 63/08* (2013.01); *G06F 21/335* (2013.01); *H04L 63/0807* (2013.01); *H04L 63/10* (2013.01)

(58) Field of Classification Search
CPC ...................................................... H04L 63/08
See application file for complete search history.

(56) References Cited

U.S. PATENT DOCUMENTS

| 9,143,818 B1 * | 9/2015 | Barraclough ........ H04N 21/274 |
| 2007/0100998 A1 * | 5/2007 | Ramadan ................ H04L 63/02 |
| | | 709/225 |
| 2008/0201266 A1 * | 8/2008 | Chua ...................... G06Q 20/12 |
| | | 705/67 |

(Continued)

FOREIGN PATENT DOCUMENTS

JP        2004-86510        3/2004

OTHER PUBLICATIONS

International Search Report for PCT/JP2013/077163, mailed Jan. 14, 2014, two pages.

(Continued)

*Primary Examiner* — Morshed Mehedi
(74) *Attorney, Agent, or Firm* — Nixon & Vanderhye P.C.

(57) ABSTRACT

A provider server (100) includes: a receiving section (21) for obtaining a redirection URL (2); an information registering section (11) for registering user information (3); an access authorizing section (12) for authorizing the consumer server (200) to make access to the user information; a sending section (22) for sending the redirection URL (2) to a smartphone (300); an authorization judging section (13) for judging whether or not the access is authorized; and a sending section (22) for sending the user information (3) to the consumer server (200).

7 Claims, 10 Drawing Sheets

(56) References Cited

U.S. PATENT DOCUMENTS

| | | | | |
|---|---|---|---|---|
| 2011/0047603 A1* | 2/2011 | Gordon | ................... | H04L 63/06 |
| | | | | 726/5 |
| 2012/0167185 A1* | 6/2012 | Menezes | ............... | H04L 9/3213 |
| | | | | 726/5 |
| 2014/0007198 A1* | 1/2014 | Durbha | ................. | H04L 63/102 |
| | | | | 726/4 |

OTHER PUBLICATIONS

Written Opinion of the ISA for PCT/JP2013/077163, mailed Jan. 14, 2014, three pages.

* cited by examiner

| INDEX | service_name | url | appl_url | mail_address | client_id |
|---|---|---|---|---|---|
| 1 | SERVICE A | http://servicea.com/ | appl://servicea.com/ | manager@servicea.com | 1 |
| 2 | ... | ... | ... | ... | ... |

(b)

| INDEX | user_id | passwd | mail_address | nickname | session_id | redirect_url | state | code | access_token |
|---|---|---|---|---|---|---|---|---|---|
| 1 | chiba | xxxxxxxx | chiba@chiba.com | chibam | 1g22ug3bfd4bb5h67jg89lgba0 | https://servicea.com/welcome/ | xyz | Tq1xl0BeZRRYbYS7XySb1Z | 3ZotoFAFEkr2zDs1cMXpBB |
| 2 | ... | ... | ... | ... | ... | ... | ... | ... | ... |

INFORMATION PROCESSING DEVICE AND METHOD FOR CONTROLLING INFORMATION PROCESSING DEVICE

This application is the U.S. national phase of International Application No. PCT/JP2013/077163 filed 4 Oct. 2013 which designated the U.S. and claims priority to JP 2012-266763 filed 5 Dec. 2012, the entire contents of each of which are hereby incorporated by reference.

TECHNICAL FIELD

The present invention relates to an information processing device, etc. communicable with a communication device used by a user.

BACKGROUND ART

In recent years, many kinds of web services, e.g., Social Network Service (SNS), are provided. For an increasing number of such web services, an authentication protocol that is called OAuth (Open Authorization) is widely used.

OAuth is an authentication protocol according to which user's authorization information is delivered from one service to another service. The system of OAuth includes a provider server that provides the authorization information to a consumer server, the consumer server that receives the authorization information from the provider server and provides a service to the user, and a user terminal that authorizes the provider server to provide the authorization information to the consumer server. According to OAuth, the service provided by the consumer server can use, under authorization by the user, information (in many cases, information relating to the user) that is managed by another service provided by the provider server.

With reference to FIG. 8, the following explains basic operation of a conventional provider server that employs OAuth. FIG. 8 is a schematic view showing how a display of a user terminal changes as the conventional provider server, the conventional consumer server, and the conventional user terminal communicate with each other.

A user uses a browser on the user terminal in order to make access to an authentication page (login screen) of a target service provided by the consumer server (D10), and then the user selects "login" on the page. In response to this, the consumer server transfers (redirects) a display of the browser to an authentication page of an authorization service provided by the provider server (D11).

Upon user's input of user identification information (hereinafter, referred to as "user ID") and a password for the authorization service, the provider server authenticates the user. After the user is authenticated properly and the user authorizes information (user information) relating to the user and being held by the provider server to be made usable by the target service, the provider server redirects the display of the browser to a top page of the target service (D12). A process indicated by the arrow "E" in FIG. 8 corresponds to the above description.

With reference to FIG. 9, the following provides a more detailed description of the above process. FIG. 9 is a timing chart showing details of an authorization process carried out according to conventional OAuth.

As shown in FIG. 9, transferring the authorization information between the user terminal (browser), the consumer server, and the provider server allows the consumer server to obtain authorization for access to the user information held by the provider server.

That is, the consumer server transfers, to the provider server, authority of (i) authentication of the user and (ii) access to the user information. This allows the consumer server to provide each user with a respective suitable service without carrying out troublesome processes of (i) registering the user, (ii) authenticating the user, and (iii) managing the user information. Further, this allows the user to use the target service provided by the consumer server only by carrying out user registration on the authorization service provided by the provider server.

Meanwhile, in a case where the user is not registered on the authorization service (i.e., in a case where the user selects "initial registration" on the authentication page), the consumer server redirects the display of the browser to a registration page of the authorization service (D13). Then, the user inputs a user ID, a password, and an email address on the registration page. In response to this, the provider server carries out registration of the user (D14 through D16). A process indicated by the arrow C in FIG. 8 corresponds to the above description.

With reference to FIG. 10, the following provides a more detailed description of the above process. FIG. 10 is a timing chart showing details of a conventional user registration process.

As shown in FIG. 10, when the user requests, to the provider server, user registration on the authorization service, the user information is transferred between the user terminal and the provider server. This process requires no involvement of a process carried out by the consumer server.

In addition to the above-described OAuth, there are many techniques for authentication in web services. For example, Patent Literature 1 (shown below) describes a content service providing system, which is a simple method, for allowing a user who is not a member of a certain members-only content site to browse the content of the site.

CITATION LIST

Patent Literatures

Patent Literature 1

Japanese Patent Application Publication, Tokukai, No. 2004-86510 A (Publication Date: Mar. 18, 2004)

SUMMARY OF INVENTION

Technical Problem

However, the above conventional system has a first problem that processes from registration to authorization are not seamless. Namely, after the user finishes the process indicated by the arrow C in FIG. 8, the user must return to the authentication page of the target service (D10) (indicated by the arrow D) and select "login" again so that the user is authenticated by the provider server (D11).

However, at the point that the user completes the user registration (D16), the authentication of the user is also completed. Thus, forcing the user to carry out the process of logging into the authorization service again is not user-friendly. In other words, as separately shown in FIG. 9 and FIG. 10, the registration process and the authorization process are individually executed as different processes. This impairs convenience, and this is the problem.

Furthermore, the above conventional system has a second problem as described below. That is, as described above, the registration process and the authorization process are individually executed as different processes. Thus, at the point of completion of the user registration, the consumer server cannot provide the user with a service which is to be provided to the user after authorization by the provider server. This causes delay of provision of the service by the consumer server. This is the second problem. Thus, the user cannot start using the service only by completing the registration. Namely, the first problem causes the second problem.

Here, although the content service providing system described in Patent Literature 1 allows a user who is not a member of a certain members-only content site to browse the content of the site, this system does not enable to carry out the processes of user registration and authorization seamlessly (i.e., does not solve the first problem) or does not enable the user to browse the content of the site immediately (i.e., does not solve the second problem).

The present invention has been made in view of the above problems. An object of the present invention is to provide an information processing device, etc. of capable of carrying out processes from user registration to authorization seamlessly and causing an external server to make its service available to a user, for the purpose of solving the first and second problems and improving user convenience.

Solution to Problem

In order to solve the above problems, an information processing device according to one embodiment of the present invention is an information processing device communicable with a communication device used by a user, including: an obtaining section for obtaining first information by which a certain content included in a certain service provided by an external server is identifiable; a registering section for registering, in a case where information relating to the user is inputted after the obtaining section obtains the first information, the information relating to the user; an authorizing section for authorizing the external server to make access to the information relating to the user, in a case where the registering section registers the information relating to the user; a first sending section for sending to the communication device the first information obtained by the obtaining section, in a case where the authorizing section authorizes the external server to make access to the information relating to the user; a judging section for judging, in a case where, after the first sending section sends the first information to the communication device, the external server makes access to the information relating to the user which information is registered by the registering section, whether or not the access is authorized by the authorizing section; and a second sending section for sending the information relating to the user to the external server, in a case where the judging section determines that the access is authorized by the authorizing section.

Further, in order to solve the above problems, a method for controlling an information processing device according to one embodiment of the present invention is a method for controlling an information processing device communicable with a communication device used by a user, including the steps of: (i) obtaining first information by which a certain content included in a certain service provided by an external server is identifiable; (ii) registering, in a case where information relating to the user is inputted after the first information is obtained in the step (i), the information relating to the user; (iii) authorizing the external server to make access to the information relating to the user, in a case where the information relating to the user is registered in the step (ii); (iv) sending to the communication device the first information obtained in the step (i), in a case where the external server is authorized to make access to the information relating to the user in the step (iii); (v) judging, in a case where, after the first information is sent to the communication device in the step (iv), the external server makes access to the information relating to the user which information is registered in the step (ii), whether or not the access is authorized in the step (iii); and (vi) sending the information relating to the user to the external server, in a case where it is determined in the step (v) that the access is authorized.

Advantageous Effects of Invention

According to one embodiment of the present invention, each of the information processing device and the method for controlling the information processing device is able to carry out processes from registration to authorization seamlessly and to cause an external server to make its service available to a user, thereby improving user convenience.

BRIEF DESCRIPTION OF DRAWINGS

FIG. 4 shows tables each illustrating one example of data stored in a storage section of the provider server. (a) of FIG. 4 is a table including various information of a target service which is registered on an authorization service in advance. (b) of FIG. 4 is a table including user information.

DESCRIPTION OF EMBODIMENTS

Embodiment 1

With reference to FIGS. 1 through 6, the following provides a detailed description of First Embodiment (Embodiment 1) of the present invention.

[Overview of Registration and Authentication System 400]

Figure 2:
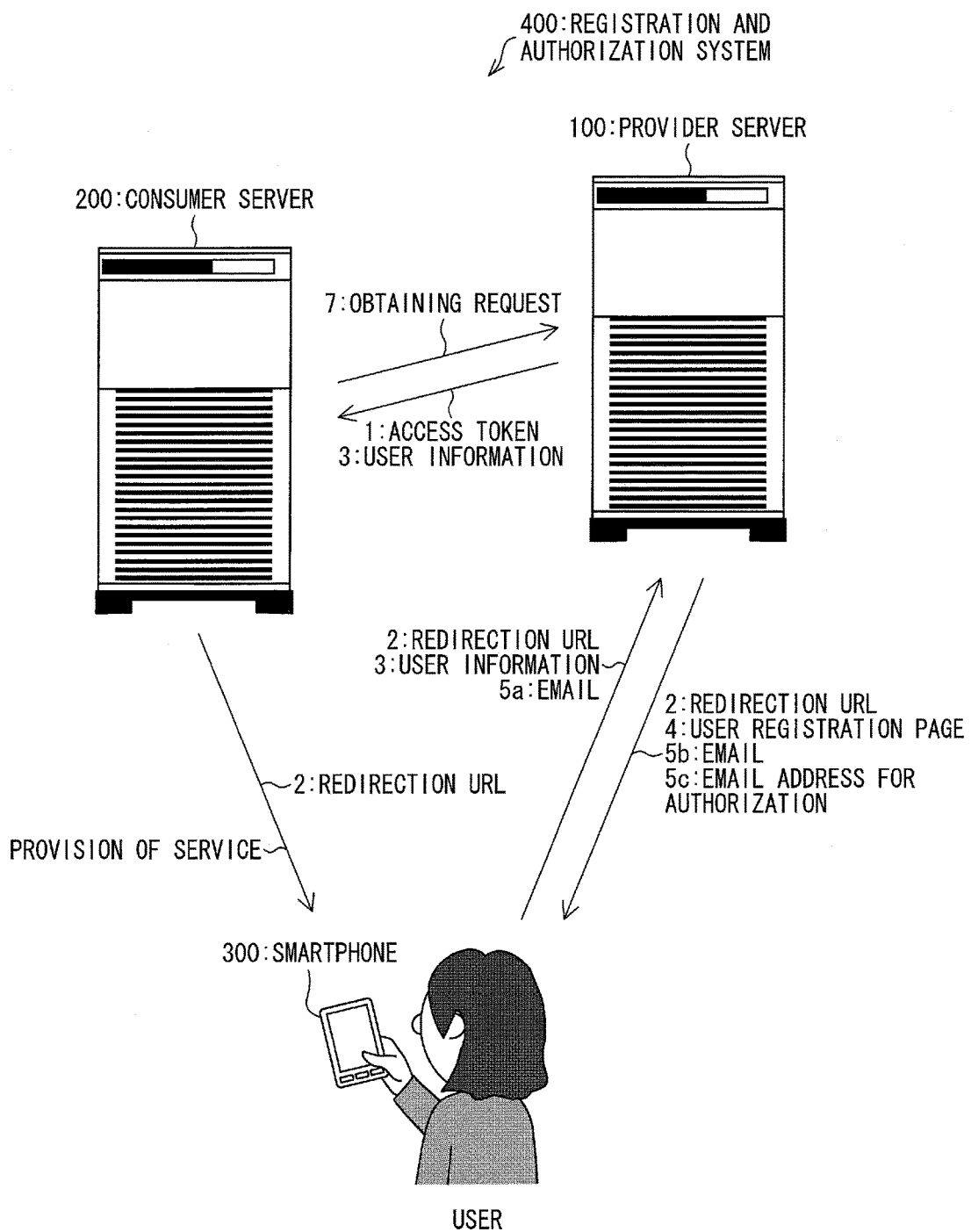
FIG. 2 is a schematic view illustrating an overview of a registration and authorization system according to First Embodiment of the present invention.

With reference to FIG. 2, the following describes an overview of a registration and authorization system 400 according to First Embodiment of the present invention.

FIG. 2 is a schematic view illustrating an overview of the registration and authorization system 400.

The registration and authorization system (information processing system) 400 is an information processing system including a provider server 100, a consumer server 200, and a smartphone 300. These three communicate with each other according to a desired communication mode. A communications network by which the three are relayed may be any one, as long as it enables communication between the three. For example, the communications network may be the Internet or Local Area Network (LAN).

The provider server (information processing device) 100 is an information processing device communicable with the smartphone 300 that is used by a user. The provider server 100 provides a service that becomes available to the user after the user carries out registration (hereinafter, such a service is referred to as "authorization service"). The authorization service includes, for example, Social Network Service (SNS). Note that the provider server 100 may be achieved by a system including a single server or a plurality of servers.

The consumer server (external server) 200 is a server providing a certain service that is used by the user (hereinafter, such a service is referred to as "target service"). If the user authorizes the provider server 100 to provide the consumer server 200 with user information (information relating to the user) 3, the provider server 100 authorizes provision of the user information to the consumer server 200. Consequently, the consumer server 200 is able to provide the target service by use of the user information.

The smartphone (communication device) 300 is a communication device communicable with the provider server 100 and the consumer server 200. The same function of the smartphone 300 can be achieved by a mobile phone, a personal computer, or a tablet terminal. Namely, the terminal may not be the smartphone, as long as the terminal is a device that is capable of inputting and outputting necessary information.

According to the registration and authorization system 400, if the user carries out user registration on the authorization service via the target service, the provider server 100 regards the user registration as authorization that allows the provider server 100 to provide the consumer server 200 with the user information 3.

Thus, after the provider server 100 registers the user, the provider server 100 authorizes the provision of the user information 3 without asking the user for authorization again, and transfers (redirects) the display of the smartphone 300 to a certain content (for example, a top page that will appear after the user logs into the target service) identified by a redirection URL 2 obtained from the consumer server 200.

Namely, the provider server 100 is able to execute processes from registration to authorization seamlessly and to cause the consumer server 200 to make the target service available to the user. In other words, the consumer server 200 can register the user and immediately provide the user with the service based on authorization. Thus, the provider server 100 can improve user convenience.

Further, the consumer server 200 provides the user with the target service that uses the user information 3 registered on the provider server 100, and thus the provider server 100 can make the user aware that the user is using the service to which the user gave authorization for use of the user information.

[Function of Provider Server 100]

Figure 3:
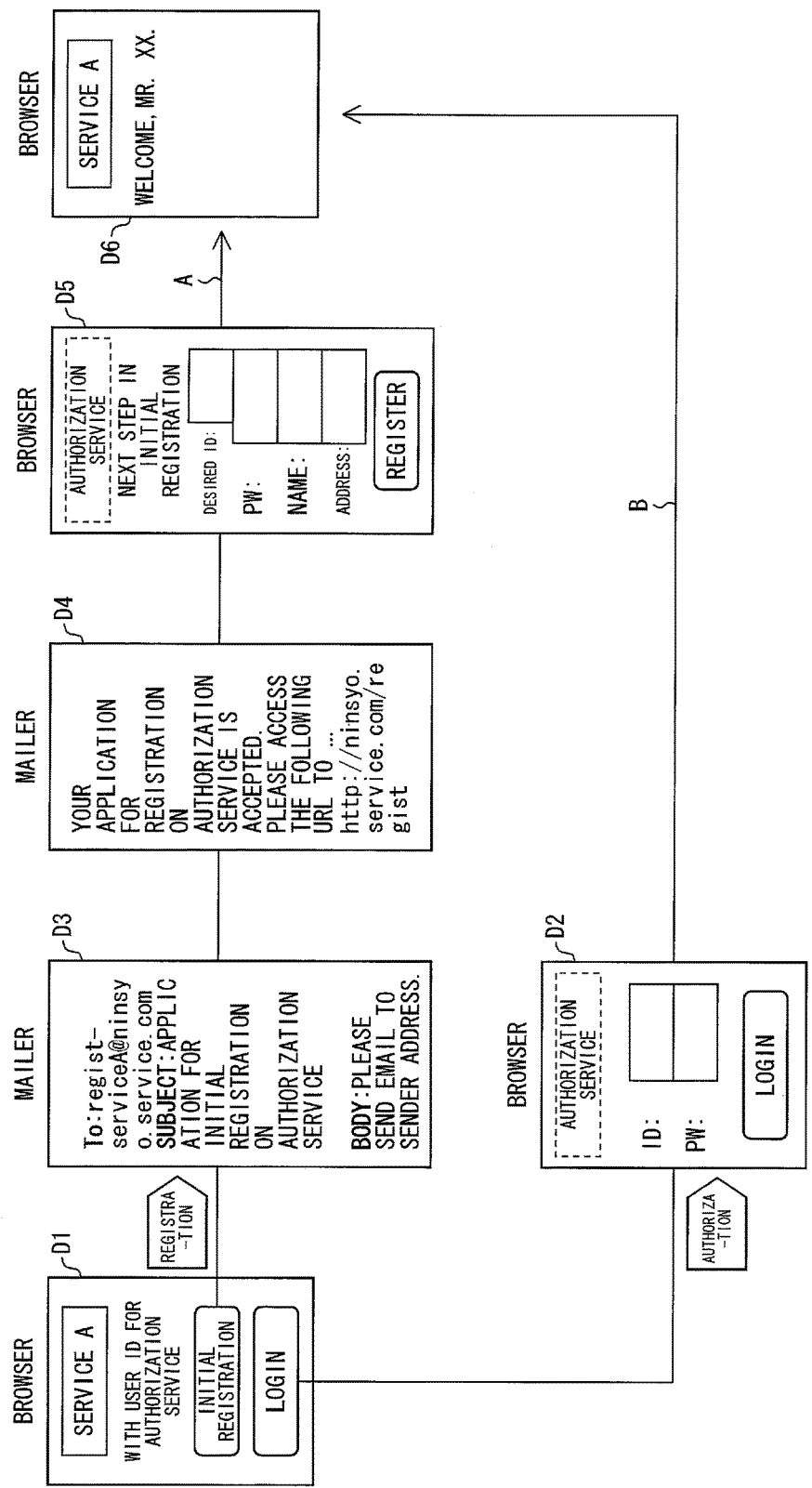
FIG. 3 is a schematic view illustrating how a display of a smartphone changes as the smartphone communicates with the provider server and a consumer server.

With reference to FIG. 3, the following describes basic operation of the provider server 100. FIG. 3 is a schematic view illustrating how a display of the smartphone 300 changes as the smartphone 300 communicates with the provider server 100 and the consumer server 200.

First, the user makes access to the authentication page (login screen) of the target service via a browser of the smartphone 300 (D1). Upon user's selection of the "login" on the authentication page, the consumer server 200 redirects a display of the browser to an authentication page of the authorization service (D2).

If user identification information (hereinafter, referred to as "user ID" or simply as "ID") and a password for the authorization service are inputted, the provider server 100 authenticates the user. After the user is authenticated properly and the user authorizes the user information 3 registered on the authorization service (i.e., held by the provider server 100) to be made usable by the target service, the provider server 100 redirects the display of the browser to a top page (certain content) that will appear after the user logs into the target service (D6). A process indicated by the arrow B in FIG. 3 corresponds to the above description.

Meanwhile, if the user selects "initial registration" on the authentication page, the consumer server 200 transmits the redirection URL 2 for the target service to the provider server 100 via the smartphone 300. Thus, the provider server 100 can obtain the redirection URL.

The redirection URL (first information, information indicating where a certain web page is) 2 is information by which a redirection destination (certain content) included in the target service is identifiable. As described above, the redirection URL may be a URL which specifies a top page (D6) that will appear after the user logs into the target service.

Next, the provider server 100 transmits to the smartphone 300 an email address for accepting initial user registration on the authorization service, so as to prompt the user to send an email back to the email address (D3). Upon reception of the email sent from the smartphone 300, the provider server 100 transmits to the smartphone 300 an email including a URL (authorization service URL) that identifies a user registration page for the authorization service (certain interface) 4 (D4).

Note that the purpose in the provider server 100's prompting the smartphone 300 to send an email back is to examine whether or not an email address of the smartphone 300 actually exists (i.e., to check if the email address is valid). This makes it possible for the provider server 100 to avoid a disadvantageous action, for example, registering an unauthorized sending destination involuntarily.

The user information 3 is inputted via the user registration page 4 (D5), so that user registration on the authorization service is completed. Then, the provider server 100 sends the redirection URL 2 to the smartphone 300, so as to redirect the display of the browser to the top page of the target service (D6).

Figure 8:
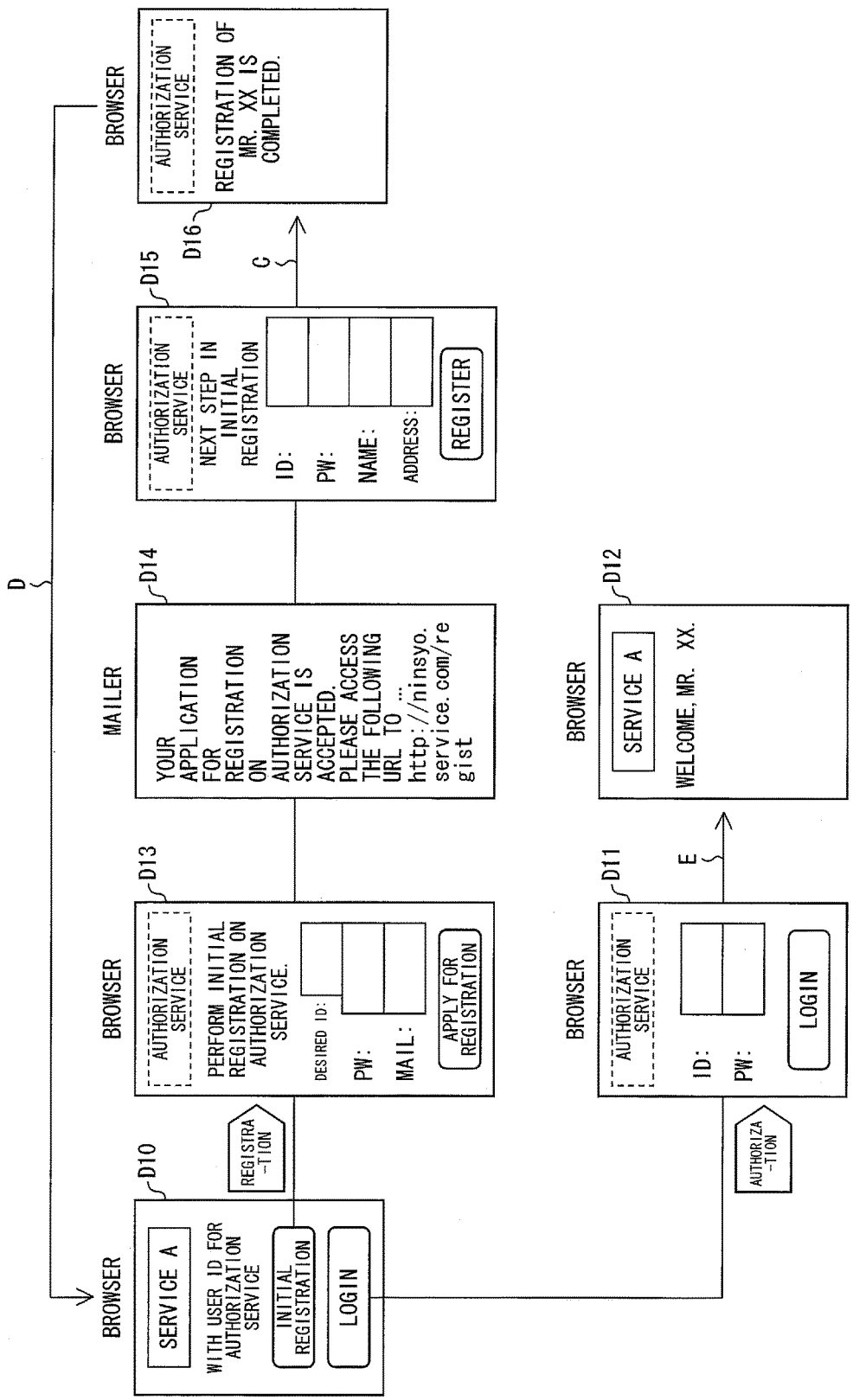
FIG. 8 is a schematic view illustrating how a display of a user terminal changes as a conventional provider server, a conventional consumer server, and a conventional user terminal communicate with each other.
Figure 9:
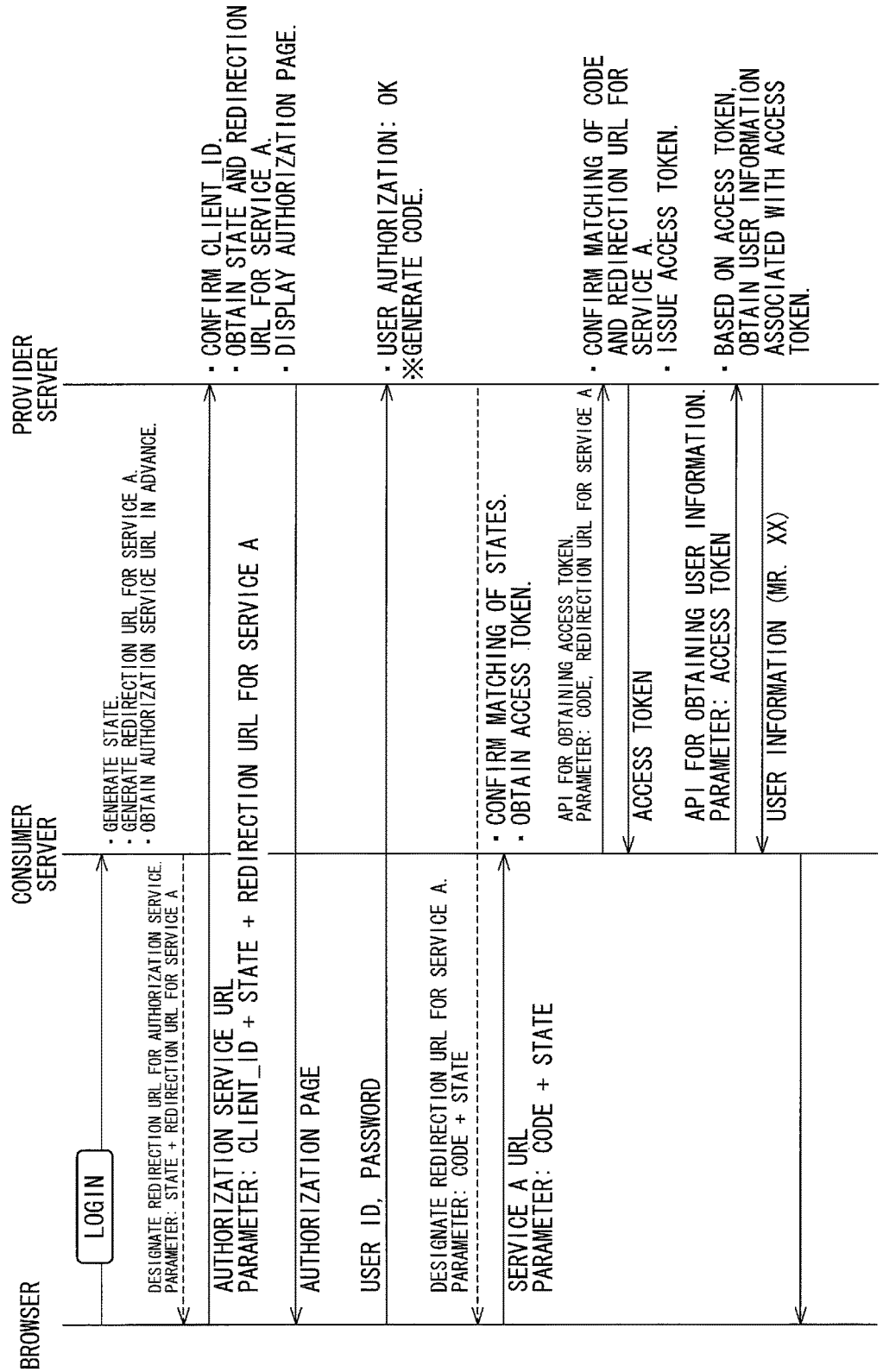
FIG. 9 is a timing chart illustrating details of an authentication process according to conventional OAuth.
Figure 10:
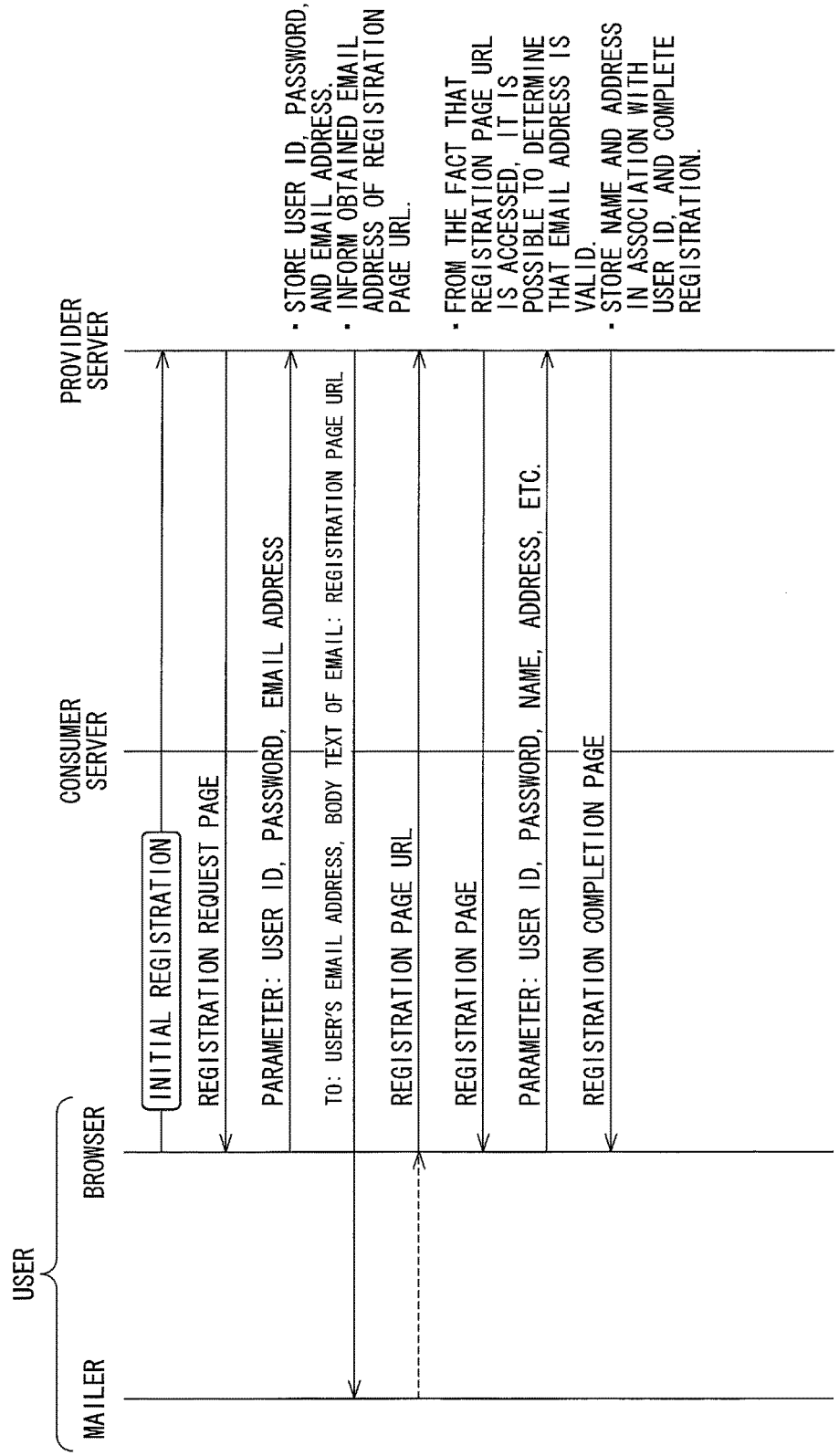
FIG. 10 is a timing chart illustrating details of a conventional user registration process.

Here, FIG. 3 (provider server 100) is compared with FIG. 8 (conventional technique) in order to clearly show a difference between the provider server 100 according to one embodiment of the present invention and the above-described conventional technique. FIG. 8 shows the process for authorization (the process indicated by the arrow C in FIG. 8) and the process for registration (the process indicated by the arrow E in FIG. 8) individually as independent processes. On the other hand, FIG. 3 shows the process for authorization and the process for registration as a series of processes (indicated by the arrow A in FIG. 3) in an integrative manner. This is the difference between them.

Namely, the process for authorization and the process for registration, which have been conventionally executed in an independent manner, can be executed by the provider server 100 as a series of processes. In other words, the provider server 100 is able to solve the conventional problem (first problem) that processes from registration to authorization are not seamless.

Further, the provider server 100 is able to execute the above processes as a series of processes, and thus is able to cause the consumer server 200 to make its service available to the user. Namely, the provider server 100 can solve the conventional problem (second problem) of delay in the provision of the service by the consumer server.

Thus, the provider server 100 can improve user convenience.

[Configuration of Provider Server 100]

Figure 1:
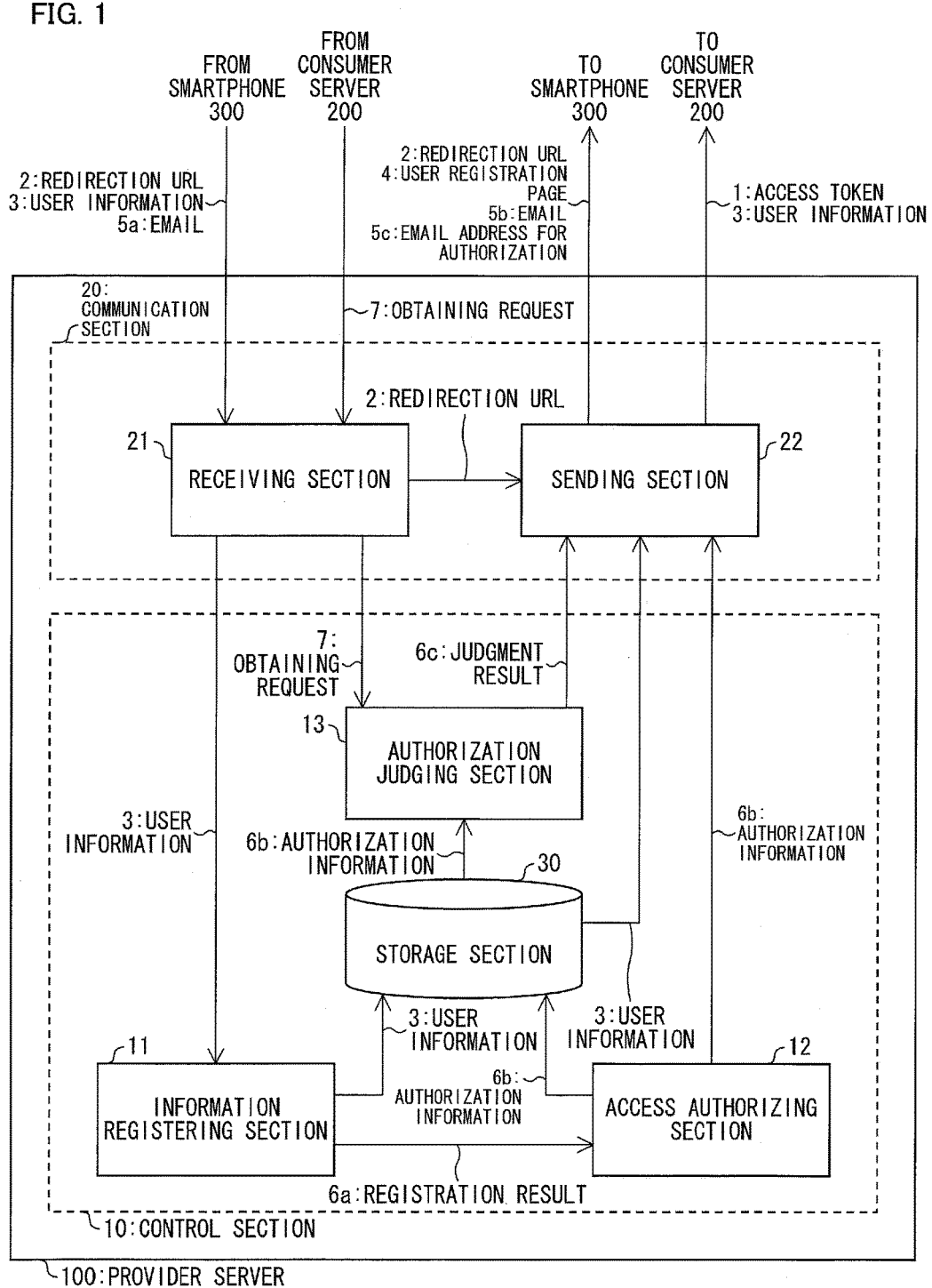
FIG. 1 is a block diagram illustrating a main configuration of a provider server according to First Embodiment of the present invention.

With reference to FIG. 1, the following describes a configuration of the provider server 100. FIG. 1 is a block diagram illustrating a main configuration of the provider server 100.

In order to simplify the descriptions, parts which do not have a direct relation with the present embodiment (for example, a part for accepting an input from a user via an input interface such as a keyboard) are omitted from the descriptions of the configurations and the block diagrams. However, depending on an actual condition of an embodiment, the provider server 100 may include the omitted parts.

The following explains functions of a communication section 20, a receiving section 21, a sending section 22, a control section 10, an information registering section 11, an access authorizing section 12, an authorization judging section 13, and a storage section 30 in this order.

The communication section 20 carries out communication with an external entity over a communications network complying with a predetermined communication mode. The communication section 20 only needs to have an essential function that enables communication with an external device, and there is no limitation on a communication line, a communication mode, a communication media, and/or the like. For example, the communication section 20 may be achieved by a device such as Ethernet (Registered Trademark) adapter. The communication section 20 may employ a communication mode or a communication media such as IEEE 802.11 radio communication or Bluetooth (Registered Trademark). The communication section 20 includes the receiving section 21 and the sending section 22.

The receiving section (obtaining section) 21 obtains a redirection URL 2 by which a redirection destination (for example, a top page that will appear after the user logs into the target service) is identifiable, the redirection destination being included in the target service (web service) provided by the consumer server 200. Specifically, in a case where the smartphone 300 sends the redirection URL 2, the receiving section 21 receives the redirection URL and outputs the received redirection URL 2 to the sending section 22.

Further, the receiving section (examining section) 21 sends to the smartphone 300 an email (message) 5b including information for identifying a user registration page 4 via which user information 3 is able to be inputted, in order to examine whether or not a destination of the email exists (the presence or absence of the destination of the email).

Specifically, the receiving section 21 examines whether or not the destination of the email exists by judging whether or not the email 5b sent to the smartphone 300 by the sending section 22 arrives at the sending destination (i.e., by judging whether or not an error mail is sent back). This makes it possible for the provider server 100 to avoid a disadvantageous action, for example, registering an unauthorized sending destination involuntarily.

Further, the receiving section 21 executes, for example, processes as follows: (1) The receiving section 21 receives the user information 3 inputted by the user via the user registration page 4, and outputs the user information 3 to the information registering section 11; (2) The receiving section 21 receives an email 5a sent from the smartphone 300; (3) The receiving section 21 receives from the consumer server 200 an obtaining request 7 for the user information 3, and outputs the obtaining request 7 to the authorization judging section 13.

In a case where the access authorizing section 12 authorizes provision of the user information 3 to the consumer server 200, the sending section (first sending section, second sending section) 22 sends to the smartphone 300 the redirection URL 2 obtained by the receiving section 21. Specifically, in a case where the access authorizing section 12 inputs to the sending section 22 authorization information 6b indicating that the provider server 100 has authorized provision of the user information 3 to the consumer server 200, the sending section 22 sends to the smartphone 300 the redirection URL 2 inputted by the receiving section 21.

Further, in a case where access of the consumer server 200 to the user information 3 is determined to be authorized by the authorization judging section 13, the sending section 22 also sends the user information 3 to the smartphone 300. Specifically, when the sending section 22 receives from the authorization judging section 13 a judgment result 6c indicating that the consumer server 200 having sent the obtaining request 7 is authorized to make access to the user information 3, the sending section 22 reads out from the storage section 30 the user information 3 that is requested by the consumer server 200, and sends to the consumer server 200 the user information 3 thus read out.

Furthermore, the sending section 22 executes, for example, the following processes: (1) The sending section 22 sends an email address 5c for authorization to the smartphone 300; (2) The sending section 22 sends to the smartphone 300 the email 5b including information for identifying the user registration page 4 via which the user information 3 is able to be inputted; (3) The sending section 22 sends the user registration page 4 to the smartphone 300; (4) The sending section 22 sends an access token 1 to the consumer server 200.

The access token (second information) 1 is information that enables the consumer server 200 to make access to the user information 3. For example, the access token 1 may have a data structure including a description of account identification information (e.g., user ID and/or a password) and/or authority (e.g., a definition of a period and/or a range in which access is allowed). The consumer server 200 can obtain the user information 3 from the provider server 100 by, for example, calling an API that takes the access token 1 as an argument.

The control section 10 comprehensively controls various functions of the provider server 100. Further, the control section 10 executes, for example, the following processes: (1) The control section 10 judges whether or not the smartphone 300 has made access to the user registration page 4; (2) The control section 10 generates a session ID, and stores, in the storage section 30, a state and the redirection URL 2 in association with the session ID; (3) The control section 10 checks an email address for authorization, stores an email address of the user, and checks the session ID; (4) The control section 10 discards the session ID and generates a code; (5) The control section 10 verifies the code and the redirection URL 2 so as to check if the argument is valid, and issues the access token 1 for the consumer server 200. The control section 10 includes the information registering section 11, the access authorizing section 12, the authorization judging section 13, and the storage section 30.

If the user information 3 is inputted after the receiving section 21 obtains the redirection URL 2, the information registering section (registering section) 11 registers the user information. Specifically, upon reception of the user information 3 inputted from the receiving section 21, the information registering section 11 stores the user information 3 in the storage section 30 according to a predetermined format (for example, a table format that will be described later with reference to (b) of FIG. 4).

Upon storage of the user information 3 in the storage section 30, the information registering section 11 outputs to the access authorizing section 12 a registration result 6a indicative of completion of registration. If the registration is failed for some reasons (for example, a reason that the user has been already registered), the information registering section 11 may output to the access authorizing section 12 a registration result 6a indicating that the registration is failed.

In a case where the information registering section 11 has registered the user information 3, the access authorizing section (authorizing section) 12 authorizes the consumer server 200 to make access to the user information. Specifically, upon reception of the registration result 6a indicative of completion of the registration from the information registering section 11, the access authorizing section 12 outputs to the sending section 22 authorization information 6b indicating that the provider server 100 has authorized provision of the user information 3 to the consumer server 200. Further, the access authorizing section 12 stores the authorization information in the storage section 30.

In a case where the consumer server 200 makes access to the user information 3 registered by the information registering section 11, the authorization judging section (judging section) 13 uses the access token 1 to judge whether or not the access is authorized by the access authorizing section 12.

Specifically, upon reception of the obtaining request 7 for the user information 3 from the receiving section 21, the authorization judging section 13 reads out the authorization information 6b from the storage section 30. Then, the authorization judging section 13 judges whether or not the consumer server 200, which has sent the obtaining request, has been authorized to make access to the user information 3, and outputs the judgment result 6c to the sending section 22. This makes it possible for the provider server 100 to avoid a disadvantageous action, for example, sending the user information 3 to an unauthorized consumer server 200.

The storage section 30 is a storage device in which various information (which will be described in detail later with reference to FIG. 4) used by the provider server 100 is storable. The storage section 30 may be achieved by, for example, hard disc, a semiconductor memory, or DVD. According to the present embodiment, the storage section 30 is shown in FIG. 1 as being included in the control section 10 of the provider server 100. Alternatively, the storage section 30 may be an external storage device externally connected with the provider server 100 in a communicable manner.

With reference to FIG. 4, the following describes one example of various information stored in the storage section 30. FIG. 4 shows tables each illustrating one example of data stored in the storage section 30. (a) of FIG. 4 is a table including various information of the target service which is registered on the authorization service in advance. (b) of FIG. 4 is a table including the user information 3.

As shown in (a) of FIG. 4, all target services provided by the consumer server 200 are registered on the authorization service in advance. The table of the target service may include, for example, an index, a name of the target service, a URL of the target service, a URL for designating an application (information capable of starting a certain application), an email address of an administrator of the target service, and/or a client ID (client_id).

The URL for designating the application (hereinafter, referred to as "application start URL") is a URL that is capable of starting an application installed on the smartphone 300. In a case where a plurality of applications are capable of processing a single URL, the smartphone 300 lists the plurality of applications and starts an application selected by the user among the plurality of applications.

For example, in a case where a URL of a web page such as "appl://servicea.com?url=https://ninsyo.service.com/regist" (e.g., the redirection URL 2) is given as an argument and the provider server 100 designates an application start URL (the sending section 22 incorporates the application start URL into the redirection URL 2 and sends the redirection URL to the smartphone 300), the smartphone 300 starts an application corresponding to the application start URL, so that the web page is displayed by the application (this process will be described in detail later in Second Embodiment).

As shown in (b) of FIG. 4, the user information 3 may include, for example, an index, a user ID, a password, an email address of the user, a nickname of the user, a session ID, a redirection URL, a state (a random value used to ensure security), a code (information by which the user is identifiable and which is necessary for the provider server 100 to issue the access token 1), and/or an access token.

[Process Executed by Provider Server 100]

Figure 5:
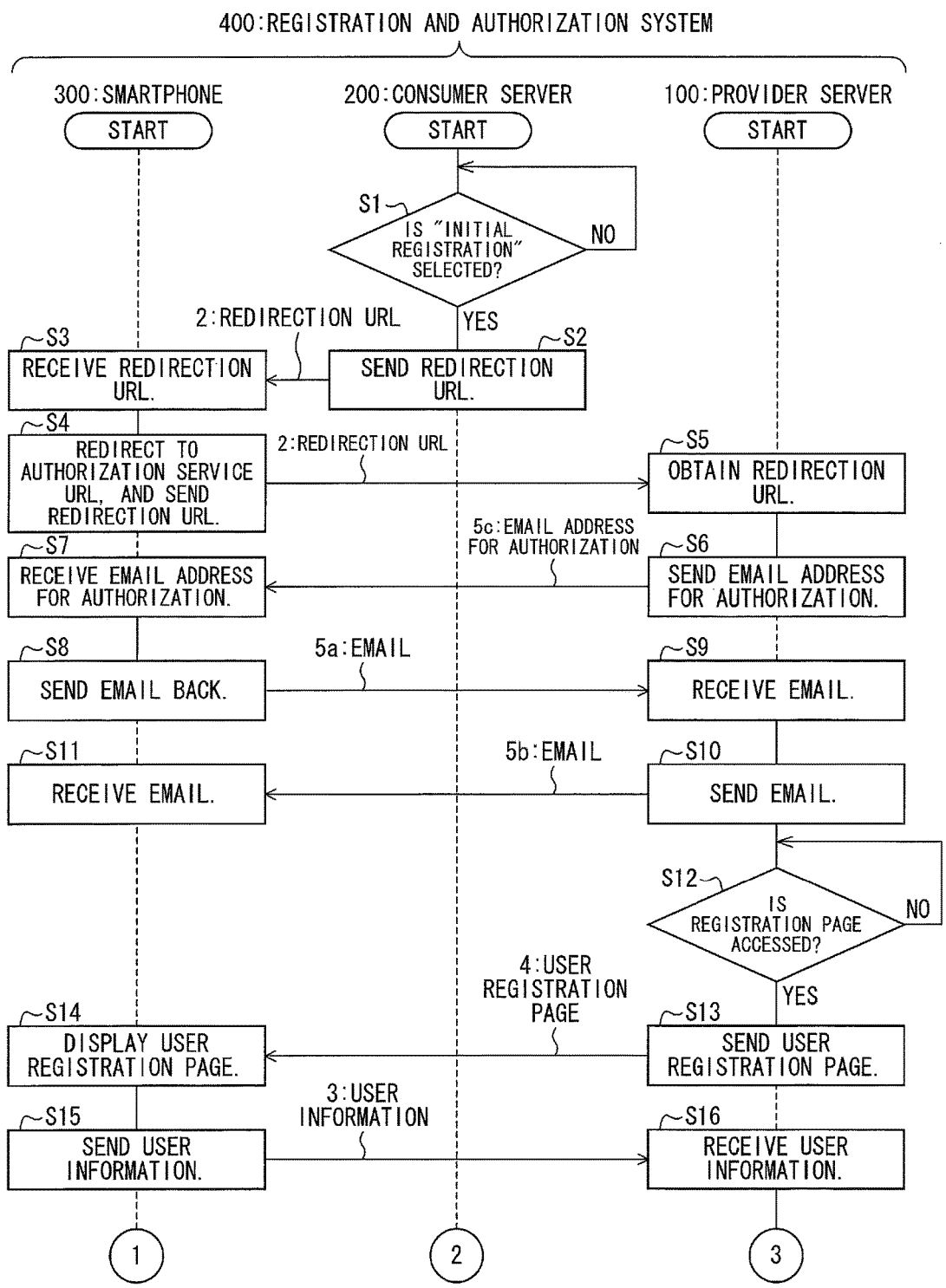
FIG. 5 is a flow chart illustrating an example of the first half of processes executed by the registration and authorization system.
Figure 6:
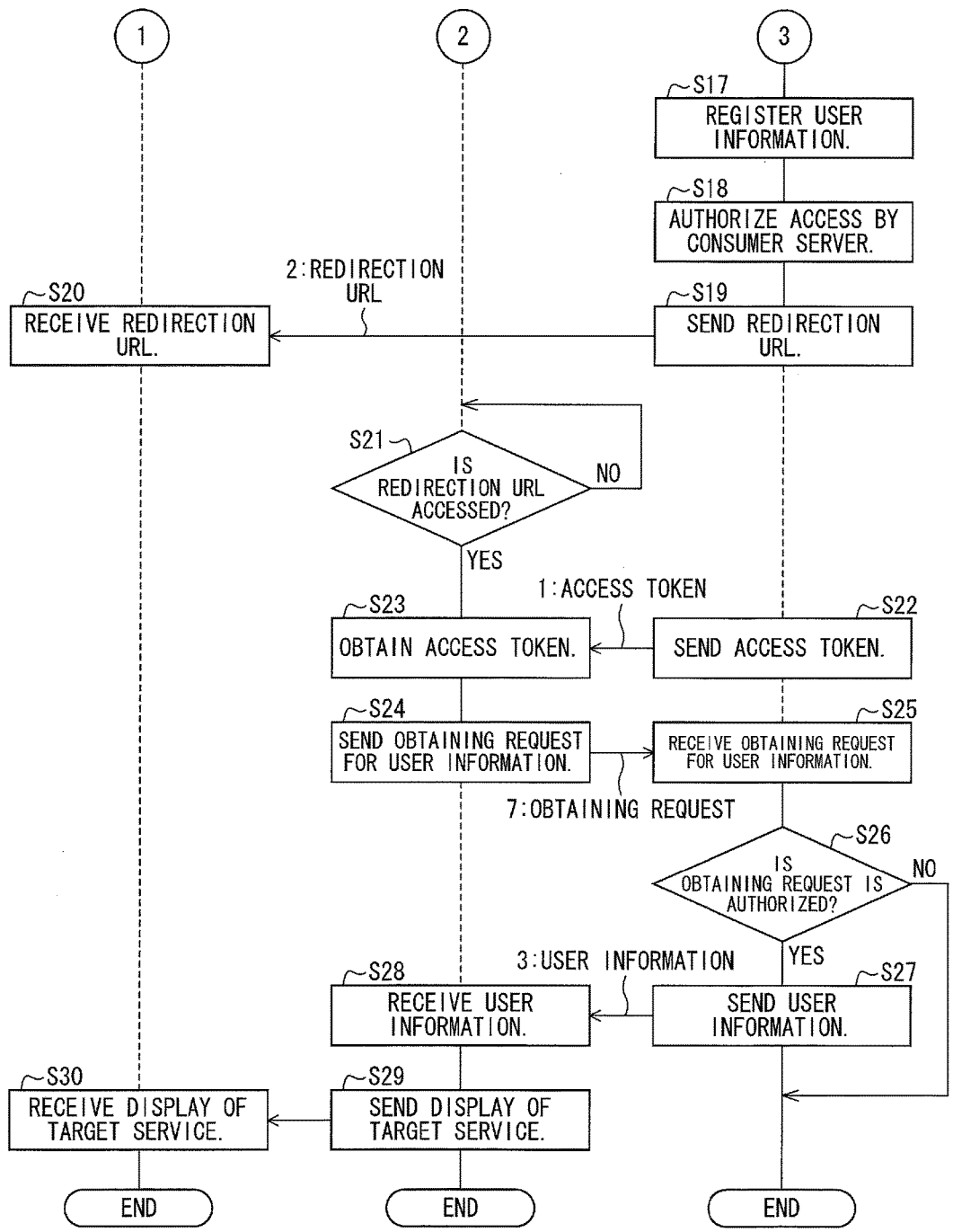
FIG. 6 is a flow chart illustrating an example of the latter half of the processes executed by the registration and authorization system.

With reference to FIGS. 5 and 6, the following describes a flow of processes executed by the registration and authorization system 400. FIG. 5 is a flow chart illustrating an example of the first half of the processes executed by the registration and authorization system 400 (i.e., the processes executed by the provider server 100, the consumer server 200, and the smartphone 300). FIG. 6 is a flow chart illustrating an example of the latter half of the processes executed by the registration and authorization system 400.

Because of the size of the drawing, a series of the processes are expressed in a divided manner, i.e., in (i) FIG. 5 illustrating the first half of the series of the processes and (ii) FIG. 6 illustrating the latter half of the series of the processes. In the following descriptions, the expression "xx step" in parentheses indicates a step in a method for controlling the registration and authorization system.

Upon user's selection of "initial registration" on the authentication page for the target service (YES in step 1; hereinafter, abbreviated as "S1"), the consumer server 200 sends the redirection URL 2 to the smartphone 300 (S2). Note that the consumer server 200 may also send a value of the state together with the redirection URL 2.

Upon reception of the redirection URL (S3), the smartphone 300 makes access to a registration page (authorization service URL) for an authorization service designated by the consumer server 200, and sends the redirection URL 2 to the provider server 100 (S4). Note that the smartphone 300 may also send the value of the state and the client ID together with the redirection URL 2.

When the receiving section 21 of the provider server 100 obtains the redirection URL 2 (S5, obtaining step), the sending section 22 sends the email address 5c for authorization to the smartphone 300 (S6). In this process, the control section 10 may generate a session ID, and may store in the storage section 30 the state and the redirection URL 2 in association with the session ID. Further, the sending section 22 may incorporate the session ID into, e.g., the body of an email from which a replay email is able to be sent to the email address 5c for authorization.

The smartphone 300 receives the email address 5c for authorization (S7), and then the smartphone 300 sends the email 5a back to the email address for authorization (S8). Then, the receiving section 21 receives the email (S9).

The sending section 22 sends to the smartphone 300 the email 5b including information for identifying the user registration page 4 via which user information 3 is able to be inputted (S10). As described above, by judging whether or not the email is received by the smartphone 300 (S11), the receiving section 21 is able to examine whether or not the destination of the email exits.

Note that the processes from S6 to S11 may not be executed. Namely, it is possible to omit the processes for exchanging emails in order to examine whether or not the destination of the email exists.

When the control section 10 detects that the smartphone 300 makes access to the user registration page 4 (YES in S12), the sending section 22 generates the user registration page 4 and sends to the smartphone 300 the user registration page 4 thus generated. In this process, the control section 10 may execute processes such as checking an email address for authorization, storing a user's email address, and/or checking a session ID.

Note that the sending section 22 may incorporate the session ID into the user registration page 4, and may send the value of the state, the redirection URL 2, and the session ID together with the user registration page 4.

If the user information 3 (for example, a user ID, a password, and/or a nickname; see (b) of FIG. 4) is inputted via the user registration page after the smartphone 300 receives the user registration page 4 (S14), the smartphone 300 sends the user information to the provider server 100 (S15). In this process, the smartphone 300 may send the state, the redirection URL 2, and the session ID together with the user information.

The receiving section 21 receives the user information 3 (S16), and the information registering section 11 registers (S17, registration step) the user information 3 thus received. Then, the access authorizing section 12 authorizes the consumer server 200 to make access to the user information 3 (S18, authorization step). In this process, the control section 10 may discard the session ID and generate a code.

The sending section 22 sends the redirection URL 2 to the smartphone 300 (S19, first sending step), so that the display of the browser is redirected to a top page of the target service (S20). Note that the sending section 22 may send the state and the code together with the redirection URL 2.

If the consumer server 200 detects that the smartphone 300 makes access to the redirection URL 2 (YES in S21), the consumer server 200 obtains an access token 1 from the provider server 100 (S22, S23).

Specifically, by taking the code and the redirection URL 2 as arguments, the consumer server 200 calls an API for obtaining the access token 1. If the control section 10 determines that the code and the redirection URL 2 are not invalid arguments by verifying the code and the redirection URL 2, the control section 10 issues the access token 1 for the consumer server 200.

The consumer server 200 uses the access token 1 to send an obtaining request 7 for the user information 3 to the provider server 100 (S24). Specifically, the consumer server 200 calls an API for obtaining the user information 3 by giving the access token 1 as an argument.

The receiving section 21 of the provider server 100 receives the obtaining request 7 (S25), and then the authorization judging section 13 judges whether or not the obtaining request is authorized by the access authorizing section 12 (S26, judgment step). If the obtaining request 7 is determined to be authorized (YES in S26), the sending section 22 sends the user information 3 to the smartphone 300 (S27, second sending step). Specifically, the sending section 22 reads out the user information 3 corresponding to the access token from the storage section 30, and sends the user information to the smartphone 300.

Upon reception of the user information 3 (S28), the consumer server 200 generates a display for the target service with use of the user information (for example, a page that will appear after the user logs into the target service as illustrated in D6 in FIG. 3), and sends the display to the smartphone 300 (S29). The smartphone 300 receives the display from the consumer server 200 (S30).

[Effects Given by Provider Server 100]

The provider server 100 carries out the processes from registration to authorization seamlessly and causes the consumer server 200 to make its service available to the user, thereby improving user convenience.

Embodiment 2

Figure 7:
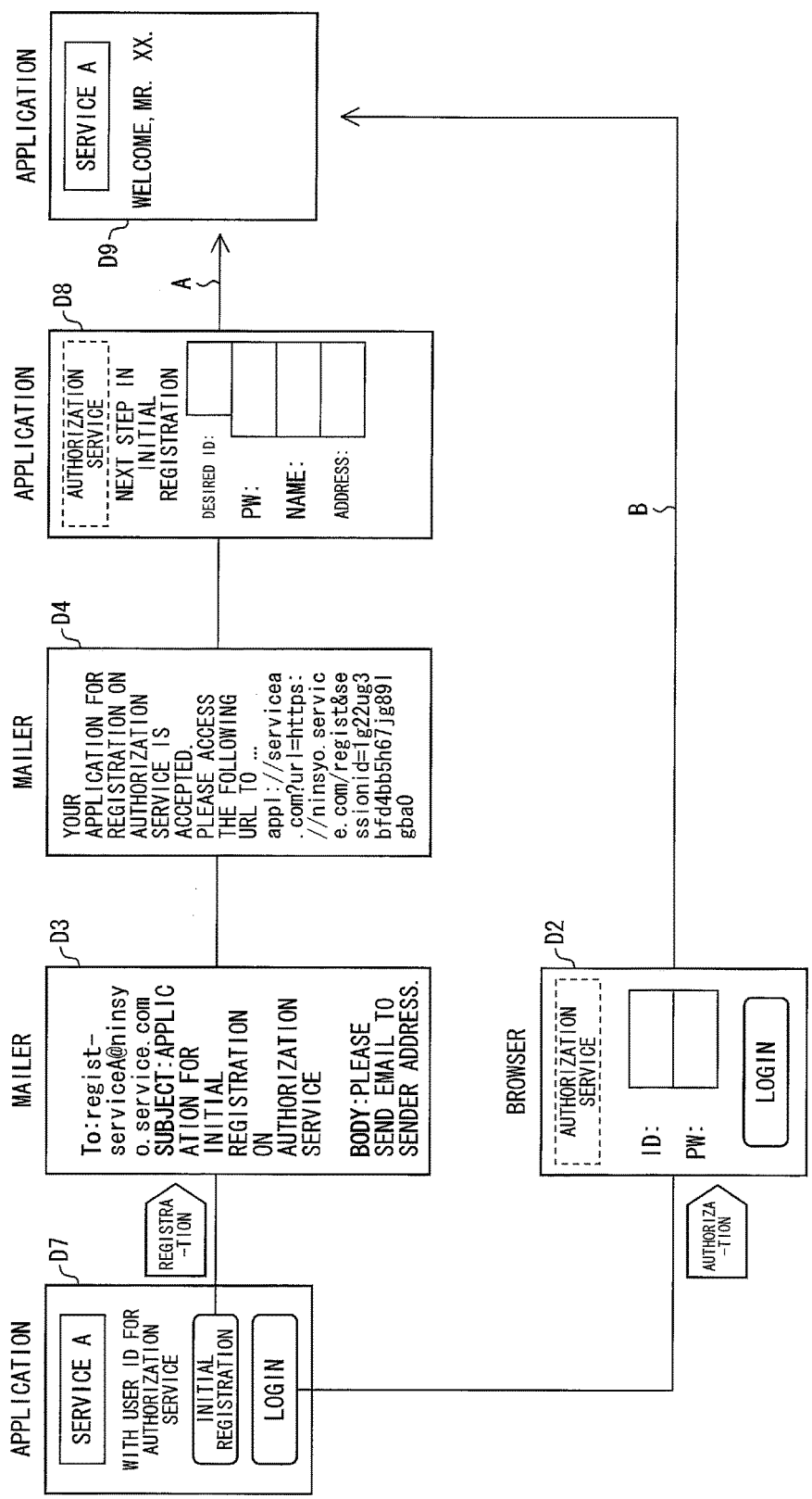
FIG. 7 is a schematic view illustrating how a display of a smartphone changes as the smartphone communicates with a provider server and a consumer server according to Second Embodiment of the present invention.

With reference to FIG. 7, the following gives details descriptions of Second Embodiment (Embodiment 2) of the present invention. Note that parts of a configuration not described with reference to FIG. 7 below are the same as those described in First Embodiment.

[Example in which Application is Used]

With reference to FIG. 7, the following describes basic operation of the provider server 100 which basic operation is different from Embodiment 1. FIG. 7 is a schematic view illustrating how a display of a smartphone 300 changes as the smartphone 300 communicates with a provider server 100 and a consumer server 200.

First, a user uses an application in the smartphone 300 to make access to an authentication page (login screen) of a target service (D7), and selects "login" on the authentication page. Then, the consumer server 200 redirects a display of a browser to an authentication page of an authorization service (D2). Namely, the application is made inactive (inoperable), whereas the browser is made active (operable) and the authentication page is displayed on the browser.

Note that the application is an exclusive application via which the user uses the target service.

Upon user's input of a user ID and a password for the authorization service, the provider server 100 authenticates the user. After the user is authenticated properly and the user authorizes the user information 3 held by the provider server 100 to be used in the target service, the provider server 100 redirects an display of the application to a top page of the target service (D9). Namely, the browser is made inactive (inoperable), whereas the application is made active (operable) and the top page is displayed on the application.

On the other hand, when the user selects "initial registration" on the authentication page, the consumer server 200 sends a redirection URL 2 for the target service to the provider server 100 via the smartphone 300. Thus, the provider server 100 can obtains the redirection URL.

Next, the provider server 100 sends to the smartphone 300 an email address (email address 5*c* for authorization) for accepting initial registration on the authorization service, so as to prompt the user to send an email back to the email address (D3). Note that, the email from which a reply email is able to be sent to the email address 5*c* for authorization may include an application start URL.

Upon reception of the email sent back from the smartphone 300, the provider server 100 sends to the smartphone 300 an email including an application start URL ("appl:// servicea.com?url=https://ninsyo.service.com/regist . . . " in D4) in which a URL of the user registration page 4 is given as an argument (D4).

Note that the provider server 100 may give not only the URL of the user registration page 4 but also a session ID as arguments. With this, the same information as with the case where the access is made to the authorization service via the browser can be transmitted from the application to the authorization service.

After the user information 3 is inputted via a user registration interface (D8) and user registration on the authorization service is completed, the provider server 100 sends the redirection URL 2 to the smartphone 300 so that the display of the application is redirected to the top page of the target service (D6). Namely, the provider server 100 is able to allow the user to start using the target service after carrying out registration of the user and authorization of the target service.

Note that the redirection URL sent from the provider server 100 is specifically an "application start URL including the redirection URL given as an argument" (the code and the state may be further given as arguments). With this, the provider server 100 is able to cause the smartphone 300 to start the application identified by the application start URL so that the smartphone 300 displays a page of the redirection destination.

Further, the application may include a process for processing the application start URL and making access to the redirection URL in the argument by a browser function. Thus, even with different applications, user registration and authorization can be processed commonly by the browser. Therefore, the provider server 100 can cause the smartphone 300 to store a browser cookie indicative of completion of user registration and authorization.

The above description has dealt with an example where the application start URL is sent via the email. However, the application start URL may not be sent via the email. For example, instead of the email including the application start URL in which the URL of the user registration page 4 is given as the argument, the provider server 100 may sends to the smartphone 300 an e-mail including a URL of the user registration page 4 in which URL a client ID is given as an argument.

In this case, the smartphone 300 starts the browser so as to display the URL (a URL of the provider server 100) of the user registration page 4. Based on the client ID given as the argument, the provider server 100 obtains the application start URL from the table shown in (a) of FIG. 4, gives a predetermined parameter to the application start URL, and redirects the smartphone 300 (i.e., sends the application start URL), in order to start the application identified by the application start URL.

Embodiment 3

Blocks of a provider server 100 (particularly, an information registering section 11, an access authorizing section 12, an authorization judging section 13, a receiving section 21, and a sending section 22) may be achieved by a logical circuit (hardware) provided on, e.g., an integrated circuit (IC chip) or by software with use of a CPU (Central Processing Unit).

In the latter case, the provider server 100 includes, e.g., (i) a CPU executing instructions in programs (control programs) realizing each function, (ii) a ROM (Read Only Memory) or a storage device in which the programs and various data are stored in a computer (or CPU)-readable manner (each of the ROM and the storage device is referred to as "storage medium"), and a RAM (Random Access Memory) to which the programs are loaded. The computer (or CPU) reads out the programs from the storage medium and executes the programs, so that the objects of the present invention are attained. The storage medium may be a "non-temporary tangible medium", for example, tapes, a disc, a card, a semiconductor memory, or a programmable logical circuit. Further, the programs may be delivered to the computer over any transfer medium (e.g., communications network or a broadcast wave) capable of transferring the programs. Further, the present invention encompasses data signals embedded in a carrier wave in which the programs are embodied by electronic transfer.

[Summary]

An information processing device (provider server 100) according to aspect 1 of the present invention is (1) an information processing device (provider server 100) communicable with a communication device (smartphone 300) used by a user, including: (2) an obtaining section (receiving section 21) for obtaining first information (redirection URL 2) by which a certain content included in a certain service provided by an external server (consumer server 200) is identifiable; (3) a registering section (information registering section 11) for registering, in a case where information (user information 3) relating to the user is inputted after the obtaining section obtains the first information, the information relating to the user; (4) an authorizing section (access authorizing section 12) for authorizing the external server to make access to the information relating to the user, in a case where the registering section registers the information relating to the user; (5) a first sending section (sending section 22) for sending to the communication device the first information obtained by the obtaining section, in a case where the authorizing section authorizes the external server to make access to the information relating to the user; (6) a judging section (authorization judging section 13) for judging, in a case where, after the first sending section sends the first information to the communication device, the external server makes access to the information relating to the user which information is registered by the registering section, whether or not the access is authorized by the authorizing section; and (7) a second sending section (sending section 22) for sending the information relating to the user to the external server, in a case where the judging section determines that the access is authorized by the authorizing section.

As described above, according to the conventional technique, the processes from registration to authorization are not seamless (first problem). Namely, in a case where a new user is registered on a service provided by the information processing device, the user must be authenticated again by the information processing device. In other words, the processes of registration and authorization are executed as individual processes. This impairs usability.

Further, according to the conventional technique, the processes of registration and authorization are executed as individual processes, and thus the user cannot use the certain service only by completing the registration. This causes delay of provision of the certain service by the external server (second problem). This further impairs usability.

On the other hand, according to the information processing device including the above configuration of the present invention, upon registration of the information relating to the user, the information processing device authorizes the external server to make access to the information. Further, the information processing device sends to the communication device the first information by which the certain content is identifiable.

Namely, the processes of registration and authorization, which are conventionally executed as individual processes, can be executed in an integrative manner as a series of processes according to the information processing device including the above configuration of the present invention. Thus, the information processing device is able to carry out the processes of registration and authorization seamlessly (i.e., to solve the first problem).

Further, according to the information processing device including the above configuration of the present invention, in a case where the external server makes access to the information relating to the user after the processes of registration and authorization are executed in an integrative manner, the information processing device judges whether or not the access is authorized. If the information processing device determines that the access is authorized, the information processing device sends the information relating to the user to the external server. Thus, the information processing device is able to cause the external server to provide the service (i.e., the information processing device is able to solve the second problem).

Thus, the information processing device can improve user convenience.

Further, an information processing device according to aspect 2, including the features of the aspect 1, may be configured such that: (1) in a case where the authorizing section authorizes the external server to make access to the information relating to the user, the first sending section further sends to the external server second information (access token 1) that enables the external server to make access to the information relating to the user; and (2) the judging section uses the second information to judge whether or not the access is authorized by the authorizing section.

The second information is information for enabling the external server to make access to the information relating to the user. Therefore, the information processing device is able to allow the external server to make access to the information relating to the user.

Further, an information processing device according to aspect 3 of the present invention, including the features of the aspect 1 or 2, may be configured to further include: (1) an examining section (receiving section 21) for sending to the communication device a message (email 5*b*) including information for identifying a certain interface (user registration page 4) via which the information relating to the user is able to be inputted, in order that the examining section examines whether or not a sending destination of the message exists, (2) wherein, in a case where the examining section determines that the sending destination exists, the registering section may register, as the information relating to the user, information inputted by the user via the certain interface.

According to the above configuration, in a case where it is determined that the destination of the message exists, the information processing device registers, as the information relating to the user, the information inputted by the user via the certain interface. This allows the information processing device to avoid a disadvantageous action, for example, registering an unauthorized sending destination involuntarily.

Further, an information processing device according to aspect 4 of the present invention, including the features of any one of the aspects 1 through 3, may be configured such that: (1) the obtaining section obtains, as the first information, information (redirection URL 2) indicating where a certain web page included in a web service provided by the external server is.

According to the above configuration, the first information may be information capable of starting the certain web page. Thus, the information processing device can improve user convenience.

Further, an information processing device according to aspect 5 of the present invention, including the features of the aspect 4, may be configured such that: (1) the first sending section incorporates, into the first information, information capable of starting a certain application, and sends the first information to the communication device.

According to the above configuration, the first information includes the information capable of starting the certain application. Thus, the information processing device can improve user convenience.

Further, a method according to aspect 6 for controlling an information processing device is (1) a method for controlling an information processing device communicable with a communication device used by a user, including the steps of: (2) (i) obtaining (S5) first information by which a certain content included in a certain service provided by an external server is identifiable; (3) (ii) registering (S17), in a case where information relating to the user is inputted after the first information is obtained in the step (i), the information relating to the user; (4) (iii) authorizing (S18) the external server to make access to the information relating to the user, in a case where the information relating to the user is registered in the step (ii); (5) (iv) sending (S19) to the communication device the first information obtained in the step (i), in a case where the external server is authorized to make access to the information relating to the user in the step (iii); (6) (v) judging (S26), in a case where, after the first information is sent to the communication device in the step (iv), the external server makes access to the information relating to the user which information is registered in the step (ii), whether or not the access is authorized in the step (iii); and (7) (vi) sending (S27) the information relating to the user to the external server, in a case where it is determined in the step (v) that the access is authorized.

Thus, the method for controlling the information processing device provides the same effects as those given by the information processing device according to the aspect 1.

Further, an information processing system (registration and authorization system 400) according to another aspect of the present invention may include: (1) an information processing device according to any one of the above aspects; (2) a server for supplying the certain service; and (3) a communication device used by a user.

According to the above configuration, the information processing system provides the same effects as those given by the information processing device.

Note that each of the information processing device, the server, and the communication device may be realized by a computer. In such a case, the computer is caused to operate as each means of the information processing device, the server, and the communication device, and thus (i) a control program for causing the computer to realize the information processing device, the server, and/or the communication device and (ii) a computer-readable storage medium in which the computer program is stored are encompassed in the scope of the present invention.

[Combination of Features (Technical Means) in Embodiments]

The present invention is not limited to the description of the embodiments above, but may be altered by a skilled person within the scope of the claims. An embodiment based on a proper combination of technical means disclosed in different embodiments is encompassed in the technical scope of the present invention. Further, a combination of technical means disclosed in the different embodiments may provide new technical features.

INDUSTRIAL APPLICABILITY

The present invention is widely applicable to, e.g., information processing devices communicable with a communication device used by a user, for example, to a server, a personal computer, a general purpose computer.

REFERENCE SIGNS LIST

1 Access token (second information)
2 Redirection URL (first information, information indicating where a certain web page is, information capable of starting a certain application)
3 User information (information relating to a user, information inputted by a user)
4 User registration page (certain interface)
5b Email (message)
11 Information registering section (registering section)
12 Access authorizing section (authorizing section)
13 Authorization judging section (judging section)
21 Receiving section (obtaining section, examining section)
22 Sending section (first sending section, second sending section)
100 Provider server (information processing device)
200 Consumer server (external server)
300 Smartphone (communication device)
400 Registration and authorization system (information processing system)

The invention claimed is:

1. An information processing device communicable with a communication device used by a user, comprising:
a memory; and
a central processing unit (CPU) configured to:
(i) obtain first information by which a certain content included in a certain service provided by an external server is identifiable;
(ii) register, in a case where information relating to the user is inputted after the CPU obtains the first information, the information relating to the user;
(iii) authorize the external server to make access to the information relating to the user, in a case where the CPU registers the information relating to the user;
(iv) send to the communication device the first information obtained by the CPU, in a case where the CPU authorizes the external server to make access to the information relating to the user;
(v) judge, in a case where, after the CPU sends the first information to the communication device, the external server makes access to the information relating to the user which information is registered by the CPU, whether or not the access is authorized by the CPU;
(vi) send the information relating to the user to the external server, in a case where the CPU judges that the access is authorized by the CPU; and
(vii) send to the communication device a message including certain information in order that the CPU examines whether or not a sending destination of the message exists,
wherein, in a case where the CPU determines that the sending destination exists, the CPU registers, as the information relating to the user, information inputted by the user based on the certain information.

2. The information processing device as set forth in claim 1, wherein:
in a case where the CPU authorizes the external server to make access to the information relating to the user, the CPU further sends to the external server second information that enables the external server to make access to the information relating to the user; and
the CPU uses the second information to judge whether or not the access is authorized by the CPU.

3. The information processing device as set forth in claim 1, wherein the message includes information for identifying a certain interface via which the information relating to the user is able to be inputted.

4. The information processing device as set forth in claim 1, wherein:
the CPU obtains, as the first information, information indicating a location of a certain web page included in a web service provided by the external server.

5. The information processing device as set forth in claim 4, wherein:
the CPU incorporates, into the first information, information capable of starting a certain application, and sends the first information to the communication device.

6. A method for controlling an information processing device communicable with a communication device used by a user, comprising the steps of:
(i) obtaining first information by which a certain content included in a certain service provided by an external server is identifiable;
(ii) registering, in a case where information relating to the user is inputted after the first information is obtained in the step (i), the information relating to the user;
(iii) authorizing the external server to make access to the information relating to the user, in a case where the information relating to the user is registered in the step (ii);
(iv) sending to the communication device the first information obtained in the step (i), in a case where the external server is authorized to make access to the information relating to the user in the step (iii);
(v) judging, in a case where, after the first information is sent to the communication device in the step (iv), the external server makes access to the information relating to the user which information is registered in the step (ii), whether or not the access is authorized in the step (iii); and
(vi) sending the information relating to the user to the external server, in a case where the access is judged to be authorized in the step (v); and
(vii) sending to the communication device a message including certain information in order to examine whether or not a sending destination of the message exists, wherein, in a case where the sending destination is determined to exist, information inputted by the user is registered as the information relating to the user in the step (ii), based on the certain information.

7. The method of claim 6, further comprising including in the message information for identifying a certain interface via which the information relating to the user is able to be inputted.

\* \* \* \* \*